Jan. 13, 1953 G. C. SEAVEY 2,625,380
THRUST ABSORBING DEVICE FOR ROTATIONALLY OSCILLATING SYSTEMS
Filed May 25, 1951 2 SHEETS—SHEET 1
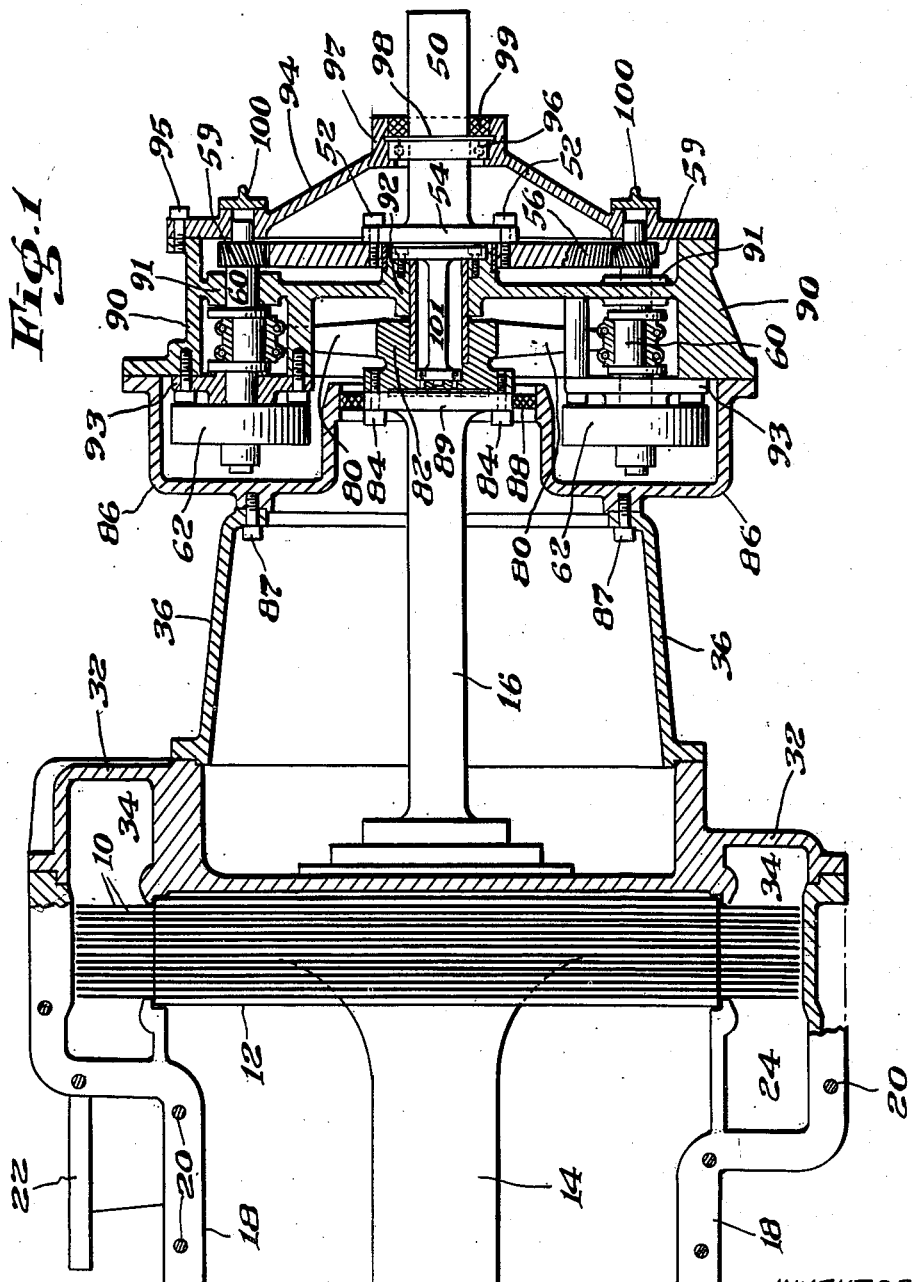
INVENTOR
Gordon C. Seavey
BY  W. R. Hulbert
ATTORNEY

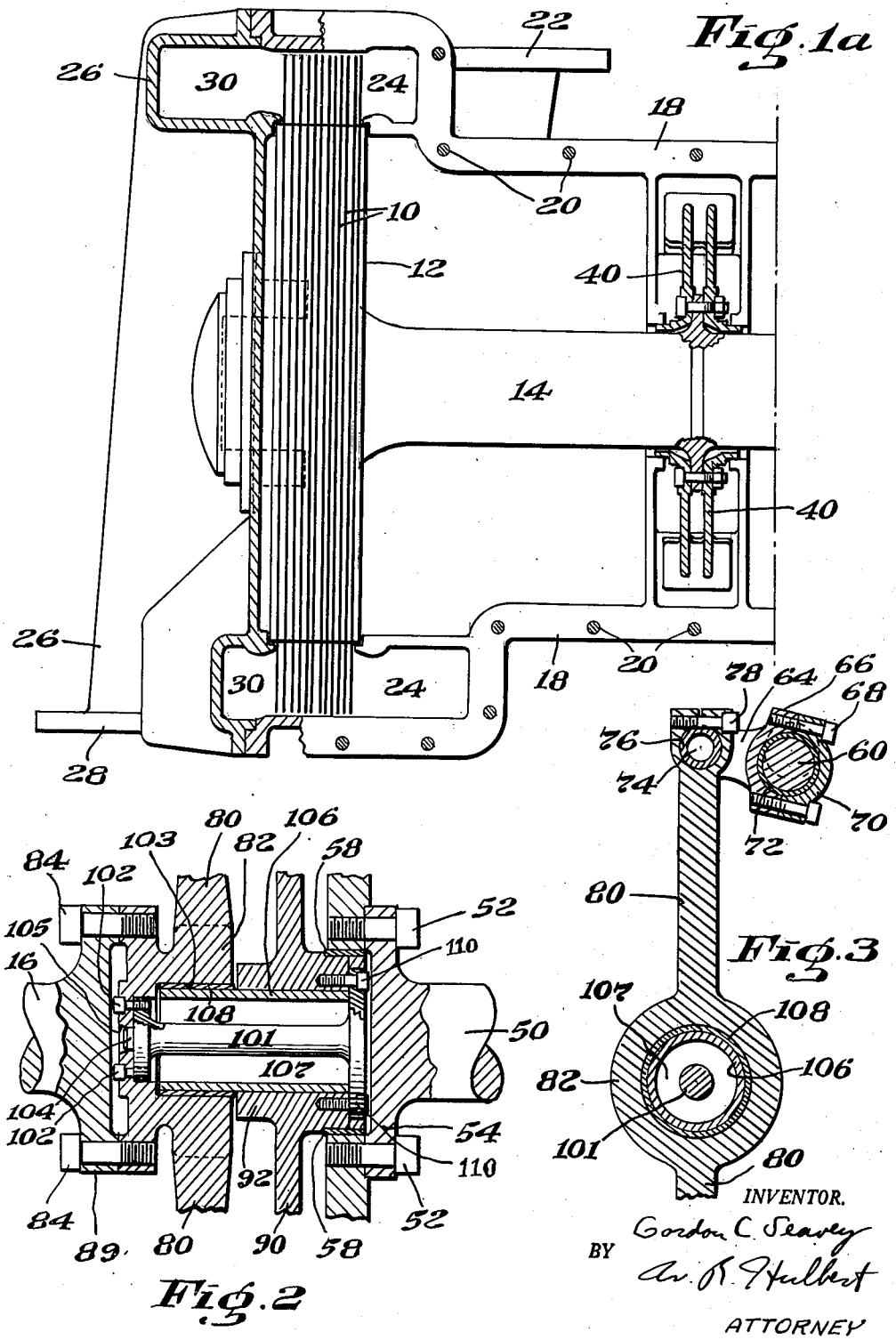

Patented Jan. 13, 1953

2,625,380

UNITED STATES PATENT OFFICE 2,625,380

THRUST ABSORBING DEVICE FOR ROTATIONALLY OSCILLATING SYSTEMS

Gordon C. Seavey, Arlington, Mass., assignor to Sonic Research Corporation, Boston, Mass., a corporation of Massachusetts Application May 25, 1951, Serial No. 228,340

1 Claim. (Cl. 259—4)

This invention relates to novel thrust-absorbing apparatus for mounting bodies for rotational oscillation with respect to other relatively fixed bodies.

In machines in which a shaft must perform rotational oscillation about its long axis, it is difficult to achieve adequate lubrication of the shaft mountings. This is not the case with simple rotating shafts where lubricant is carried by the motion of the shaft as it turns in its mountings. It is generally sufficient in such instances to provide lubricant under some pressure to the journals or bearings which mount the shaft, and the lubricant is then distributed over the entire bearing surface of the shaft as it rotates. When thrust bearings are used to position a rotating shaft, and to restrain it from motion parallel to its long axis, the problem of lubrication is somewhat more difficult, but again it is solved by relying upon the tendency of the lubricant to be distributed over the bearing surface as the shaft moves.

In the case of oscillatory rotation of a shaft, however, lubricant which reaches its surface at any point will only be carried along to the extent of the amplitude of the oscillatory motion and will not be distributed over the whole bearing surface. It is necessary in these cases, therefore, to deliver lubricant at high pressure, or to arrange the points of lubrication closer together than the oscillatory travel, or both. This frequently makes it difficult to lubricate thrust bearing means adequately, for if high values of thrust must be absorbed, the provision of many lubricating passages will weaken the member structurally.

Likewise, anti-friction bearings are generally unsatisfactory for oscillating shafts, particularly at low amplitudes and high frequencies, because the wear beneath the rolling members is not distributed uniformly, soon producing grooves which interfere with proper functioning of the bearing assembly.

Accordingly, it is the primary object of the present invention to provide novel thrust-absorbing apparatus, replacing ordinary bearings, for mounting shafts for rotational oscillation, which apparatus is capable of withstanding high loads in either axial direction, and does not require lubrication.

It is a specific object of the invention to provide novel thrust-absorbing apparatus suitable for use in a machine for treating materials wherein treating surfaces are vibrated by the torsional oscillation of a two-mass spring-mounted coupled system.

According to the general scheme of my invention, I provide a relatively thin and flexible shaft arranged as an extension of the shaft which is oscillated rotationally. One end of the flexible shaft is attached to the main shaft, and the other end is fixed to the housing of the machine. During operation, the extension shaft flexes torsionally, thus permitting the main shaft to perform rotational oscillation while preventing axial motion thereof in either direction.

The operation, and other advantages and objects of the invention will be apparent from the following detailed description, taken in connection with the accompanying drawings of a preferred embodiment thereof, selected for purposes of illustration only, and in which:

Fig. 1 is a partial longitudinal cross-sectional view of a machine for treating materials with alternating shear forces embodying the apparatus of the invention;

Fig. 1a is a continuation of the view of Fig. 1;

Fig. 2 is an enlarged detail showing the relation of the thrust-absorbing torsion bar of the invention to cooperating parts of the machine; and Fig. 3 is an enlarged detail end view of one of the drive arms of the machine, shown in relation to the apparatus of the invention.

In Figs. 1 and 1a there is shown a machine for treating fluid materials with alternating shear forces imparted by the rotational oscillation of treating surfaces forming a part of a two-mass spring-mounted shaft coupled system which oscillates torsionally during normal operation of the machine. The operation of the machine is described in detail in copending application Serial No. 129,786, filed November 28, 1949, jointly by me with Caperton B. Horsley, now Patent No. 2,584,053, issued January 29, 1952.

Briefly, the machine comprises two sets of annular toothed or apertured treating blades 10 fastened to a pair of drums 12 which are mounted at each end of the main torsion shaft 14, to one end of which there is attached a relatively thinner extension drive shaft 16. The drums 12, blades 10 and main torsion shaft 14 are mounted for torsional oscillation by conventional means such as roller bearings, for example (not shown) in a main housing 18 cast, for convenience, in two parts fastened together with machine bolts 20.

The main casting 18 is provided with fluid inlet passages 22 communicating with annular manifold chambers 24 serving to distribute the fluid mixture to be treated relatively uniformly over the first of the treating surfaces 10. An end housing 26 with a fluid outlet passage 28 defines a manifold chamber 30 serving to collect treated fluid after passage perpendicular to the treating blades 10 at the end of the machine as shown in Fig. 1a.

A similar end housing 32 closes the drive end of the machine and defines a manifold chamber 34 for collecting treated fluid for discharge through an outlet passage not shown in the view of Fig. 1. A tapered cylindrical protective housing 36, enclosing the extension shaft 16, joins the end housing 32 with the housing of the drive mechanism. The treating machine is provided with a vibration damper assembly 40 located at the mid-point of shaft 14, which serves to confine its amplitude of vibration within safe limits. Such damper is the subject of my co-pending application, Serial No. 193,917, filed November 3, 1950.

The drive mechanism of the treating machine comprises a main drive shaft 50, leading to a source of motive power such as an electric motor (not shown) and fastened with machine screws 52 through an end flange 54 to the main drive gear 56. The center of this main drive gear 56 is bored out, and travels over a sleeve bearing 58, as more clearly shown in Fig. 2. The gear 56 meshes with two smaller drive gears 59 carried on crankshafts 60, both of which are provided with flywheels 62.

As shown more clearly in Fig. 3, crank arms 64 provided with half-cylindrical hubs 66 at one end are attached at the eccentric portions of crankshafts 60, by fastening with machine screws 68 to cooperating half-cylindrical members 70, enclosing sleeve bearings 72. The other ends of the crank arms 64 are provided with integrally cast pins 74, extending perpendicularly to the axis of the crank arm proper. These pins 74 ride in sleeve bearings 76 clamped in place by machine screws 78 at the end of one of the torsional drive arms 80 of the torsional drive member 82. Member 82, as shown more clearly in Fig. 2, is attached with machine screws 84 to the torsional drive shaft 16 of the treating machine.

The drive mechanism is confined in a housing consisting of several parts. The flywheel housing casting 86 is fastened with machine screws 87 to the protective housing 36, and serves also to position an oil seal 88 which contacts the periphery of flange 89 on shaft 16. The central drive housing casting 90, fastened by conventional means to the flywheel housing 86, is provided with bosses 91 bored to receive the crankshafts 60, and a central hub portion 92 bored to receive the thrust absorbing apparatus of the invention. The periphery of this hub portion 92 also serves to locate the sleeve bearing 58 on which the main drive gear 56 travels. Positioning plates 93 fastened conventionally to member 90 also serve to position the crankshafts 60.

A roughly conical end cap housing 94, bored to receive the ends of crankshafts 60, is fastened with machine screws 95. A conventional ball bearing 96 is held in place in the central hub 97 of the end cap 94, and cooperates with the main drive shaft 50. A snap ring 98 holds bearing 96 in place. The opening surrounding the shaft is closed with an oil seal 99. Screws caps 100 close the bore holes for the shafts 60. The entire treating machine may be mounted by any conventional means (not shown). Lubrication of the interior portions and moving parts of the drive mechanism is effected by conventional means which form no part of the invention and are not shown on the drawing.

In operation of the treating machine, as described so far, the main drive shaft 50 is rotated by some external driving source (not shown). The rotation is transmitted through the main drive gear 56 and smaller drive gears 59 to the crankshafts 60. The rotation of shafts 60 is converted by crank arms 64 into rotational oscillation of the arms 80 of torsional drive member 82, which, therefore, imparts torsional oscillation to the end of shaft 16. This torsional oscillation is transmitted to the two-mass coupled system composed of treating elements 10, drums 12, and shaft 14, and this system builds up to oscillation in its second mode, wherein the two masses oscillate out of phase with each other. During starting and stopping of the machine, any difference between the motion of the two-mass system and the motion of the driven end of shaft 16 is taken up by torsional flexing of shaft 16, which acts in effect as a spring mount for the two-mass system. Operation of the treating machine is discussed more fully in my copending patent application Serial No. 129,786, filed November 28, 1949, jointly with Caperton B. Horsley, now Patent No. 2,584,053, referred to above.

With this description of the machine for treating fluids with alternating shear forces in mind, it is now possible to describe more clearly the details of the apparatus of the invention, which has been illustrated in a preferred embodiment in conjunction with the said treating machine.

When the machine is used for fluid treatment with alternating shear forces imparted by the oscillatory motion of the toothed annular treating surfaces 10, fluid is introduced through the inlet passages 22 into the manifolds 24, passes perpendicularly to the toothed surfaces 10, and is withdrawn from manifolds 34 and remitted through outlet passages 30. It is obvious then that the fluid to be treated, in its passage through the treating area will exert force on the treating surfaces, which will be communicated to the drive shaft in the form of thrust acting along the axis of the shaft.

In the event that the fluid is supplied under pressure, to increase flow, or if the fluid is quite dense, or viscous, or both, the thrust may become quite pronounced. This is the case when it is desired to treat a fluid suspension of solid matter as, for example, paper pulp. Moreover, each of the treating areas—one such area surrounding each set of treating surfaces 10—may be considered independently of the other, and there may be some variation in the thrust exerted on one set of surfaces, considered with respect to the thrust exerted on the other set.

This difficulty is overcome in part by causing fluid to be treated to flow through the machine in opposed senses through the two treating areas, so that thrust on the right hand set of surfaces will be directed toward the right, and vice versa, whereby thrust effects tend to cancel. However, it is necessary to guard against any amount of thrust whatsoever in order to keep the moving parts from axial motion. As pointed out above, conventional thrust bearings are not entirely successful where oscillation is encountered, since satisfactory lubrication is difficult to achieve. To overcome this difficulty, I have invented novel apparatus for absorbing thrust which has been illustrated in a preferred embodiment in conjunction with the above-discussed fluid treating machine, but is not intended to be limited thereto.

Thus I provide a relatively small and thin torsion shaft 101, which is flanged at both ends, aligned along the common axis of shafts 14 and 16. One end of this shaft 101 is secured by machine screws 102 in a central recess 103 of torsion drive member 82, and is positoned therein by a stud projection 104 on the bar which seats in a guide hole 105 provided at the bottom of the recess 103. The other end of the shaft 101 is fastened to the central hub portion 92 of member 90 by machine screws 110. A cylinder 106, pressed into the central bore of member 90 defines an air space 107 surrounding the shaft 101. A sleeve bearing 108 positions the cylinder with respect to the walls of the recess 103 in member 80, and allows for motion of that member with respect to the cylinder.

In operation of the machine, as the torsion drive member 82 vibrates, thus imparting torsional oscillation to shaft 16, the shaft 101 will flex torsionally, the end fastened to member 82 being twisted with respect to the end secured to the stationary member 90. The amount of axial deformation of shaft 101 will be negligibly small for all amplitudes of oscillation resulting from the given throw of the crankshaft, and therefore the torsionally oscillating parts of the machine will be constrained to remain in a fixed axial position.

Any thrust which is exerted along the axis of the machine in either direction will be overcome or absorbed by the axial rigidity of the shaft 101, without in any way impairing its ability to undergo torsional flexure. Since there are no parts which move relative to one another in the thrust-absorbing mechanism proper, it is not necessary to resort to lubrication of this portion of the apparatus. Lubrication of any adjacent relatively moving parts, such as the torsion drive member 82 and the sleeve bearing 108, is entirely incidental to the successful operation of the thrust-absorbing torsion bar 101, itself.

While I have shown the thrust-absorbing torsion shaft in a preferred embodiment in conjunction with a specific machine for treating fluid materials with alternating shear forces imparted by the torsional oscillation of treating surfaces, I do not intend so to limit my invention. For example, the device of the invention has equal application whether the torsionally vibrating system to which the same is applied is mounted horizontally or vertically; it may be affixed to either or both ends of the system; its utility is not impaired in the event that the masses of the oscillating members are different, thereby causing a change in their relative amplitudes of oscillation.

Details of the invention may be further modified in ways occurring to those skilled in the art without departing from the spirit thereof, and in general the invention may be applied to problems of absorbing thrust exerted on a body which is to be mounted for rotational oscillation with respect to another body.

Having thus described my invention, what I claim as new and desire to secure by Letters Patent is:

In apparatus for treating material with intense alternating shear forces, the combination comprising a stationary housing, a two-mass torsionally oscillating system mounted within said housing, said system comprising a pair of drums connected to each other by a torsion shaft, at least one of said drums having a treating surface adapted to contact said material, the elasticity of said shaft being correlated with the masses of said drums so that said system has a predetermined natural frequency of oscillation with said drums oscillating in opposite phase, said system including a resilient drive shaft connected in driving relation to one of said drums, mechanism for oscillating said drive shaft to bring said system into resonant oscillation at said frequency, a torsionally flexible but axially rigid shaft lying within an extension of the axis of said first named shaft and having one end connected to a portion of said housing and the other end connected to a member of said system for preventing axial motion of the members of said system and means for supplying material to be treated to said treating surface.

GORDON C. SEAVEY.

REFERENCES CITED

The following references are of record in the file of this patent:

UNITED STATES PATENTS

| Number | Name | Date |
| --- | --- | --- |
| 2,221,196 | Klavik | Nov. 12, 1940 |
| 2,254,261 | Best | Sept. 2, 1941 |
| 2,508,130 | Wharam et al. | May 16, 1950 |
| 2,588,456 | Allen | Mar. 11, 1952 |